United States Patent
Egami et al.

(10) Patent No.: US 8,182,155 B2
(45) Date of Patent: May 22, 2012

(54) LUBRICATING GREASE AND LUBRICATING GREASE-ENCLOSED ROLLER BEARING

(75) Inventors: Masaki Egami, Mie (JP); Mitsunari Asao, Mie (JP)

(73) Assignee: NTN Corporation, Osaka (JP)

( * ) Notice: Subject to any disclaimer, the term of this patent is extended or adjusted under 35 U.S.C. 154(b) by 575 days.

(21) Appl. No.: 11/990,884

(22) PCT Filed: Sep. 1, 2006

(86) PCT No.: PCT/JP2006/317315
§ 371 (c)(1),
(2), (4) Date: Feb. 22, 2008

(87) PCT Pub. No.: WO2007/026868
PCT Pub. Date: Mar. 8, 2007

(65) Prior Publication Data
US 2009/0232432 A1     Sep. 17, 2009

(30) Foreign Application Priority Data

| Sep. 2, 2005 | (JP) | P-2005-255675 |
| Sep. 2, 2005 | (JP) | P-2005-255683 |
| Nov. 15, 2005 | (JP) | P-2005-330852 |
| Nov. 15, 2005 | (JP) | P-2005-330857 |
| Nov. 17, 2005 | (JP) | P-2005-332261 |
| Jan. 20, 2006 | (JP) | P-2006-013100 |
| Jan. 20, 2006 | (JP) | P-2006-013104 |

(51) Int. Cl.
*F16C 19/00* (2006.01)
*F16C 33/30* (2006.01)
*C10M 169/00* (2006.01)
*C10M 111/04* (2006.01)

(52) U.S. Cl. ........ 384/490; 384/464; 384/462; 384/625; 384/91; 508/182

(58) Field of Classification Search .................. 384/91, 384/293, 322, 368, 420, 463, 913, 470, 492, 384/484, 571, 625, 490, 464, 462; 508/106, 508/130, 182, 250, 262, 528, 485, 496; 148/318; 428/325, 413
See application file for complete search history.

(56) References Cited

U.S. PATENT DOCUMENTS
3,625,911 A    12/1971   Redman et al.
(Continued)

FOREIGN PATENT DOCUMENTS
JP    S50-33120    3/1975
(Continued)

OTHER PUBLICATIONS
European Search Report dated Jan. 19, 2011.

*Primary Examiner* — Marcus Charles
(74) *Attorney, Agent, or Firm* — Hedman & Costigan, P.C.; James V. Costigan

(57) ABSTRACT

A lubricating grease is provided which is excellent in durability at high temperatures, inhibits the reaction between fluorine and steel and has a long life and a rolling bearing in which the lubricating grease is enclosed. The lubricating grease contains perfluoropolyether oil as a base oil thereof and fluorocarbon resin powder as a thickener thereof, a diurea compound having an —NH— bond in the molecular structure thereof, an organic-acid metal salt or a bismuth-containing compound such as bismuth sulfate. The rolling bearing has an inner ring and an outer ring disposed concentrically with each other, a plurality of rolling elements interposed between the inner ring and the outer ring, and a retainer dividedly holding the rolling elements.

10 Claims, 1 Drawing Sheet

U.S. PATENT DOCUMENTS

| | | | |
|---|---|---|---|
| 3,909,087 A * | 9/1975 | Cairns | 384/293 |
| 5,200,265 A * | 4/1993 | Seifert et al. | 428/325 |
| 5,386,400 A * | 1/1995 | Nakayama et al. | 369/13.17 |
| 5,557,157 A * | 9/1996 | Shirasaki | 310/323.11 |
| 5,663,127 A * | 9/1997 | Flynn et al. | 508/250 |
| 5,726,232 A * | 3/1998 | Egami et al. | 524/414 |
| 6,296,393 B1 * | 10/2001 | Yabe et al. | 384/463 |
| 6,329,326 B1 * | 12/2001 | Iso et al. | 508/182 |
| 6,486,103 B1 * | 11/2002 | Burdzy et al. | 508/582 |
| 6,513,981 B2 * | 2/2003 | Ooitsu | 384/470 |
| 6,601,993 B2 * | 8/2003 | Tanaka | 384/492 |
| 6,949,278 B2 * | 9/2005 | Saitoh | 428/41.7 |
| 7,271,135 B2 * | 9/2007 | Asao et al. | 508/182 |
| 2004/0101690 A1 * | 5/2004 | Saitoh | 428/421 |
| 2004/0186025 A1 | 9/2004 | Nakatani et al. | |
| 2004/0198612 A1 * | 10/2004 | Asao et al. | 508/182 |
| 2004/0208409 A1 * | 10/2004 | Kitamura et al. | 384/484 |
| 2004/0266632 A1 | 12/2004 | Iso | |
| 2005/0221996 A1 | 10/2005 | Nakatani et al. | |
| 2005/0221997 A1 | 10/2005 | Nakatani et al. | |
| 2005/0221999 A1 | 10/2005 | Nakatani et al. | |
| 2006/0251348 A1 * | 11/2006 | Egami et al. | 384/58 |

FOREIGN PATENT DOCUMENTS

| | | | |
|---|---|---|---|
| JP | 63219913 A * | 9/1988 | |
| JP | 03255223 A * | 11/1991 | |
| JP | H06-322060 | 11/1994 | |
| JP | 07103247 A * | 4/1995 | |
| JP | 07-127644 | 5/1995 | |
| JP | 07332369 A * | 12/1995 | |
| JP | H08-143883 | 6/1996 | |
| JP | 10103361 A * | 4/1998 | |
| JP | 10120140 A * | 5/1998 | |
| JP | 11-131087 | 5/1999 | |
| JP | 2000-303088 A | 10/2000 | |
| JP | 2001-65572 | 3/2001 | |
| JP | 2001-72990 | 3/2001 | |
| JP | 2001-165172 | 6/2001 | |
| JP | 2001-354986 | 12/2001 | |
| JP | 2002-054637 | 2/2002 | |
| JP | 2002-139046 | 5/2002 | |
| JP | 2002139047 A * | 5/2002 | |
| JP | 2002-302688 | 10/2002 | |
| JP | 2002-327759 | 11/2002 | |
| JP | 2003-27079 A | 1/2003 | |
| JP | 2004-003596 | 1/2004 | |
| JP | 2004-26941 | 1/2004 | |
| JP | 2004-036788 A | 2/2004 | |
| JP | 2004-076747 | 3/2004 | |
| JP | 2004-123797 A | 4/2004 | |
| JP | 2004-188607 A | 7/2004 | |
| JP | 2004-239443 | 8/2004 | |
| JP | 2004-339245 A | 12/2004 | |
| JP | 2005-42102 A | 2/2005 | |
| JP | 2005-97513 A | 4/2005 | |
| JP | 2005-105080 A | 4/2005 | |
| JP | 2005-106204 | 4/2005 | |
| JP | 2005-106205 | 4/2005 | |
| JP | 2006-232921 | 9/2006 | |
| JP | 2006-241386 | 9/2006 | |
| JP | 2006266405 A * | 10/2006 | |

* cited by examiner

LUBRICATING GREASE AND LUBRICATING GREASE-ENCLOSED ROLLER BEARING

BACKGROUND OF THE INVENTION (1) Field of the Invention

The present invention relates to lubricating grease for high temperature application and to a rolling bearing. More particularly, the present invention relates to fluorine-containing lubricating grease, for high temperature application, that can be used suitably for electric auxiliaries used for cars and at a fixing portion of an electrophotographic apparatus; and a rolling bearing in which the fluorine-containing lubricating grease is used. The present invention also relates to a rolling bearing which is used in a boundary lubrication condition such as in vacuum where the grease is enclosed in the bearing in a comparatively small amount.

(2) Description of Related Art including information disclosed under 37 CFR1.97 and 1.98

The lubricating grease is enclosed in the rolling bearing to impart lubricating performance thereto. The lubricating grease is obtained by kneading a base oil and a thickener both serving as its main component. As the base oil, mineral oil and synthetic oil such as ester oil, silicone oil, and ether oil are used. As the thickener, metal soap such as lithium soap and urea compounds are conventionally used. The lubricating grease contains additives such as an antioxidant, a rust preventive agent, a metal deactivator, a viscosity index improver, and the like as necessary.

In recent years, there are growing demands for production of a car which is compact, lightweight, and has low degree of noise. Therefore efforts are made to produce automotive electric components which are compact, lightweight, and have low degree of noise and make the interior of the engine room airtight. The electric component parts are also required to have high output and efficiency. Rolling bearings are used at shafts of many electric auxiliary machines of cars. Because the life of the lubricating grease to be enclosed in the rolling bearing is shorter than the fatigue-caused life of the rolling bearing, the life of the rolling bearing depends on the life of the lubricating grease. Therefore the lubricating grease used for automotive electric components is demanded to be more resistant to heat than urea-containing lubricating grease.

Heretofore heat-resistant fluorine-containing lubricating grease (hereinafter referred to as fluorine-containing grease) containing fluorocarbon resin powder as its thickener and perfluoropolyether (hereinafter referred to as PFPE) oil as its base oil is used as grease to be enclosed in the rolling bearing for use in a fan clutch which is heated to high temperatures up to 200° C.

Many rolling bearings for a roll for rotatably supporting a fixing roller or the like are used at a fixing portion of a copying machine, a printing machine (printer), and the like in which an electrophotographic apparatus is mounted. At the fixing portion, toner which has been charged and attached to paper is fixed thereto by applying a pressure to the toner up to a temperature as high as 250° C. In many cases, the rolling bearing for rotatably supporting the roll at the fixing portion is used at a high temperature. Especially in the case of a heat roll, there is a case in which the bearing is used at a temperature higher than 200° C. because a heater is mounted inside a hollow shaft of a heat roll to heat it from the inside thereof. There is a case in which a rolling bearing for supporting the heat roll is used through a heat-insulating sleeve made of resin to decrease the temperature of the bearing portion thereof. Nevertheless there is a case in which the temperature of the end face of the bearing becomes nearly 200° C. by radiant heat. As grease enclosed in the rolling bearing used at such a high temperature, fluorine-containing grease which deteriorates to a low extent at a high temperature and has a long life is conventionally used.

When the lubricating grease is subjected to vacuum, base oil having a high vapor pressure evaporates. Therefore the vacuum degree does not rise or the lubricating grease pollutes measuring instruments provided inside a vacuum chamber and vacuum instruments, which leads to the occurrence of defects. To overcome the disadvantage, the fluorine-containing grease is frequently used to lubricate the rolling bearing used in vacuum.

The fluorine-containing grease displays preferable lubricating performance when a sufficiently large amount of grease is present. But when the amount of the supply of the fluorine-containing grease to a rolling contact portion and to a sliding portion is insufficient and boundary lubrication is performed, the PFPE oil serving as the base oil and steel (iron) serving as the material of the bearing react with each other. As a result, the base oil decomposes and the steel wears. Thus the bearing has a short life. This reaction is conspicuous in the sliding portion between a retainer and rolling elements. When the bearing is operated for a long time, the surfaces of the rolling elements are corroded and worn to a high extent. Owing to this reaction, the PFPE oil deteriorates and is consumed. Therefore the amount of the lubricant which can be utilized decreases conspicuously and owing to the multiplication of these disadvantages, there occurs a phenomenon that the rolling bearing has a short life and seizes up.

The rolling bearing is demanded to have a long life by restraining this reaction and utilizing the heat resistance and lubricating performance inherent in the PFPE oil. Known improvements to comply with the demand include the improvement of seizing resistance and wear resistance of the fluorine-containing grease by the formation of the silica film (see patent document 1); the improvement of the rolling fatigue characteristic by the mixing of the organic antimony or the organic molybdenum (see patent document 2); the improvement of the rolling fatigue characteristic by the mixing of the bismuth compound (see patent document 3); the improvement of the wear resistance and rust preventive performance of the fluorine-containing grease by the mixing of the fluorine organic phosphorous compound (see patent document 4); the improvement of the wettability of the fluorine-containing grease to metal by the mixing of the laminar mineral powder such as molybdenum disulfide, synthetic mica, and the like, metal salt such as metal soap, metal oxide, and the like, carbon compounds such as diamond powder, graphite, and the like, melamine cyanurate, and an amino acid compound (see patent document 5); and the prevention of the deterioration of the fluorine-containing grease by the mixing of the modified undecanoic mixture, the modified butane, Cu phthalocyanine, and Ca sulfonate (see patent document 6).

However, these improvements are not made in view of the reaction between fluorine and newly generated ferrous metal surface such as a surface of steel. Thus the properties of the fluorine-containing grease are not improved radically.

The rolling element of the conventional rolling bearing is made of steel. To allow the rolling element of the rolling bearing to be corrosion-resistant and heat-resistant in a corroding environment and a high-temperature environment, there is a case where ceramic is used partly for the rolling element. But the fluorine-containing grease is not used for the ceramic rolling element. When the fluorine-containing grease superior in durability at a high temperature is used, as a measure for preventing the rolling element from being corroded by a generated fluorine gas, a rolling bearing in which the rolling element is made of ceramics instead of steel has not been put into practical use.

Patent document 1: Japanese Patent Application Laid-Open No. 2005-97513

Patent document 2: Japanese Patent Application Laid-Open No. 2000-303088

Patent document 3: Japanese Patent Application Laid-Open No. 2005-42102

Patent document 4: Japanese Patent Application Laid-Open No. 2003-27079

Patent document 5: Japanese Patent Application Laid-Open No. 2004-188607

Patent document 6: Japanese Patent Application Laid-Open No. 8-143883

DISCLOSURE OF THE INVENTION

Problems to be Solved by the Invention

It is an object of the present invention to restrain a reaction from occurring between fluorine-containing grease and steel which is a ferrous metal material constructing a bearing portion. It is another object of the present invention to provide a lubricating grease which is allowed to have a long life owing to utilization of the heat resistance and lubricity inherent in PFPE and is excellent in resistance to high temperatures by restraining the above-described reaction; and a rolling bearing in which the lubricating grease is enclosed.

Means for Solving the Problems

When the fluorine-containing grease is used in a rolling bearing, it is considered that on the frictionally worn metal surface of a rolling element, a retainer, and the like or on the newly generated metal surface thereof exposed owing to wear, fluorine contained in the base oil reacts with the newly generated ferrous metal surface such as steel or the like which is a material of a bearing, which results in the decomposition of the base oil and the wear of the steel so as to decrease the life of the rolling bearing. In a boundary lubrication condition where a contact occurs between frictional surfaces, this tendency is outstanding.

Paying attention to the above-described problem, the present invention is intended to improve lubricating performance by forming a film on the newly generated metal surface.

In the rolling bearing in which the fluorine-containing grease is enclosed, the contact and reaction between the fluorine and the steel is prevented by making a portion in which the fluorine and the steel may contact each other of resin or making rolling elements of ceramics to thereby prolong the life of the rolling bearing.

BRIEF SUMMARY OF THE INVENTION

The lubricating grease of the present invention contains PFPE oil as a base oil thereof, fluorocarbon resin powder as a thickener thereof, and an additive thereof. The additive contains a substance which reacts with a newly generated ferrous metal surface exposed owing to frictional wear of a bearing portion containing the ferrous metal material for which the lubricating grease is used, and is capable of forming a film on the newly generated ferrous metal surface.

The substance capable of forming the film on the newly generated ferrous metal surface is (1) an organic compound having an —NH— bond in a molecular structure thereof, (2) an organic-acid metal salt or (3) molybdate or a bismuth-containing compound.

The lubricating grease-enclosed rolling bearing of the present invention has an inner ring and an outer ring disposed concentrically with each other; a plurality of rolling elements interposed between the inner ring and the outer ring; and a retainer holding the rolling elements. At least one of the inner ring, the outer ring, the rolling elements, and the retainer is composed of a ferrous metal material on which a newly generated surface is exposed owing to frictional wear of a bearing portion. The lubricating grease is enclosed on the periphery of the rolling elements.

In the fluorine-containing grease-enclosed rolling bearing, a resin layer is formed on surfaces of the rolling elements or/and a contact surface of the retainer which contacts the rolling elements. The retainer is resin molding and/or the rolling elements are ceramic molding. An evaporation rate of the fluorine-containing grease at 200° C. after the grease is left for 24 hours is 0.1 to 15 wt %.

DETAILED DESCRIPTION OF THE INVENTION

Figure 1:
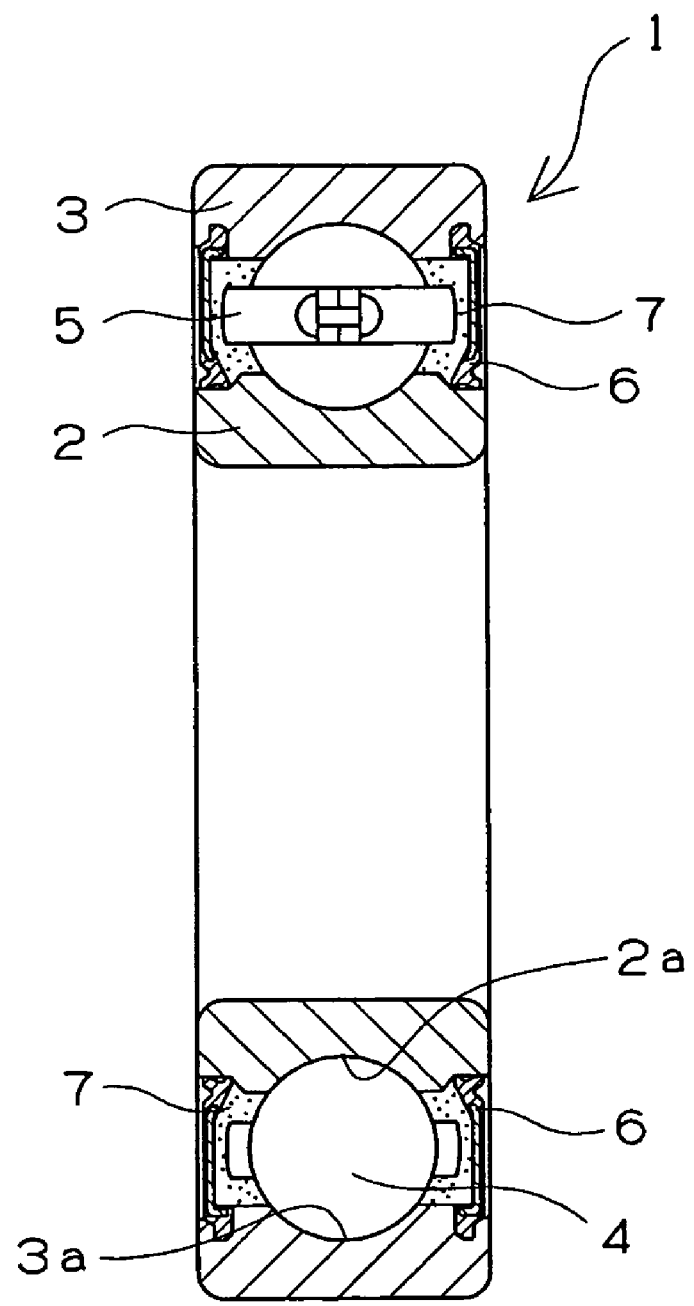
FIG. 1 is a sectional view showing a deep groove ball bearing.

The lubricating grease of the present invention contains the PFPE oil as its base oil, the fluorocarbon resin powder as its thickener, and the additive containing the substance capable of forming the film on the newly generated ferrous metal surface. Therefore the lubricating grease is superior in its durability at a high temperature and capable of restraining fluorine and steel from reacting with each other owing to the formation of the film. Thus the lubricating grease has a long life owing to the utilization of the heat resistance and lubricity inherent in the PFPE.

The lubricating grease containing the PFPE oil as its base oil, the fluorocarbon resin powder as its thickener, and the additive containing the substance capable of forming the film on the surface of the metal is enclosed on the periphery of the rolling elements of the rolling bearing of the present invention. Therefore the rolling bearing is superior in its durability at a high temperature. Further the resin layer is formed on the surfaces of the rolling elements or/and the contact surface of the retainer which dividedly holds the rolling elements with the retainer in contact with the rolling elements; the retainer is entirely made of resin; or the rolling elements are made of ceramics. Therefore fluorine and steel are prevented from reacting with each other on the surface of the rolling elements and the retainer. Thus the rolling bearing has a long life owing to the utilization of the heat resistance and lubricity inherent in the PFPE oil.

Consequently the rolling bearing can be suitably utilized for electric auxiliary machines of a car and office appliances. Further the rolling bearing can be preferably utilized in a boundary lubrication condition such as in vacuum where the grease is enclosed in the rolling bearing in a comparatively small amount.

BEST MODE FOR CARRYING OUT THE INVENTION

Fluorine-containing grease that can be used in the present invention contains PFPE oil as its base oil and fluorocarbon resin powder as its thickener.

As the PFPE oil, it is possible to use compounds formed by replacing hydrogen atoms of aliphatic hydrocarbon polyether with fluorine atoms. As PFPE oil having this structure, PFPE with side chains shown by chemical formulas 1 and 2, and straight-chain PFPE shown by chemical formulas 3 through 5 can be used. These PFPEs can be used singly or as a mixture. Reference symbols n and m of the chemical formulas 1 through 5 indicate integers.

As the PFPE oil shown by the chemical formula 1, Fomblin Y (commercial name: produced by Solvay Solexis Inc.) is commercially available. As the PFPE oil shown by the chemical formula 2, Krytox (commercial name: produced by DuPont) and Barrierta J oil (commercial name: produced by KLUBER Inc.) are commercially available. As the PFPE oil shown by the chemical formula 3, Fomblin Z (commercial name: produced by Solvay Solexis Inc.) is commercially available. As the PFPE oil shown by the chemical formula 4, Fomblin M (commercial name: produced by Solvay Solexis Inc.) is commercially available. As the PFPE oil shown by the chemical formula 5, Demnum (commercial name: produced by Daikin Industries, Ltd.) is commercially available.

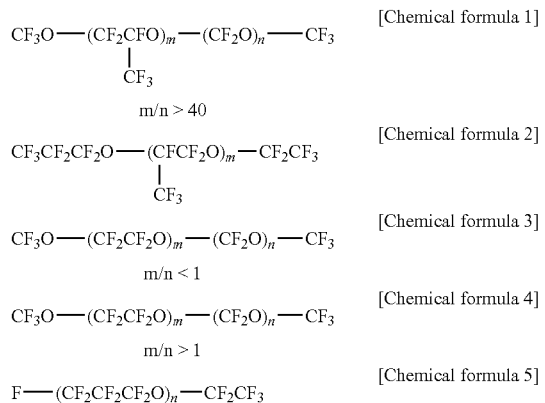

[Chemical formula 1] [Chemical formula 2] [Chemical formula 3] [Chemical formula 4] [Chemical formula 5]

As for the fluorocarbon resin powder served as the thickener of the fluorine-containing grease, powder having a high affinity for PFPE oil, good stability at high temperatures, and resistance to chemicals can be used.

As fluorocarbon resin, the following perfluorocarbon resins are preferable: polytetrafluoroethylene (PTFE) resin, tetrafluoroethylene-perfluoroalkylvinyl ether copolymer (PFA) resin, and tetrafluoroethylene-hexafluoropropylene copolymer (FEP) resin. The polytetrafluoroethylene (PTFE) resin is particularly preferable because it is excellent in stability at high temperatures and resistance to chemicals.

It is preferable that before the additive of the present invention is added to the fluorine-containing grease, the fluorine-containing grease of the present invention contains 70 to 90 wt % of the PFPE oil and 10 to 30 wt % of the fluorocarbon resin powder for the entire amount of the lubricating grease. This mixing ratio allows the lubricating grease enclosed in the rolling bearing to have a preferable consistency at which it has a small leak amount and a low torque which can be kept for a long time.

In the lubricating grease of the present invention, the substance capable of forming the film on the metal surface is added to the fluorine-containing grease as an additive.

As the substance capable of forming the film on the metal surface, organic compounds having an —NH— bond in the molecular structure thereof or organic-acid metal salts are preferable.

When any of the organic compounds having the —NH— bond in its molecular structure is added to the fluorine-containing grease, owing to the action of an unpaired electron of nitrogen, a complex film is liable to be formed on the frictionally worn metal surface of the bearing portion and the like or on the newly generated ferrous metal surface exposed owing to wear. When any of the organic-acid metal salts is added to the fluorine-containing grease, the organic-acid metal salt decomposes and reacts with the frictionally worn metal surface of the bearing portion and the like or with the newly generated ferrous metal surface exposed owing to wear, and is capable of forming a film with an iron oxide film.

Listed as the organic compounds having the —NH— bond in its molecular structure are a diurea compound, a polyurea compound, and a urethane-urea compound; compounds having a triazine ring such as melamine, benzoguanamine, melamine cyanurate; and amino resin represented by urea resin, melamine resin, benzoguanamine resin.

Of the above-described organic compounds, the diurea compound having two urea bonds in its molecular structure or mixtures of the diurea compound and synthetic oil is listed as especially preferable compounds.

The diurea compound is shown by the following chemical formula 6:

[Chemical formula 6]

($R_1$, $R_2$, and $R_3$ represent an aliphatic group, an alicyclic group, and an aromatic group respectively.)

The diurea compound shown by the chemical formula 6 is obtained by reaction between diisocyanate and monoamine. Listed as the diisocyanate are phenylene diisocyanate, diphenyl diisocyanate, diphenylmethane diisocyanate, 1,5-naphthylene diisocyanate, 2,4-trilene diisocyanate, 3,3-dimethyl-4,4-biphenylene diisocyanate, octadecane diisocyanate, decane diisocyanate, and hexane diisocyanate. Listed as the monoamine are octylamine, dodecylamine, hexadecylamine, stearylamine, oleylamine, aniline, p-toluidine, and cyclohexylamine are listed.

The diurea compound which is used in the present invention can be added to lubricating grease as a mixture of the diurea compound and the synthetic oil such as ester oil.

As the ester oil, it is possible to use diester oil, polyol ester oil, complex ester oil of these oils, and aromatic ester oil.

As examples of the ester oil, at least one ester oil selected from among esters of monovalent alcohol having 7 to 22 carbon atoms and aromatic polyvalent carboxylic acid or derivatives thereof; and esters of the monovalent carboxylic acids having 7 to 22 carbon atoms and aliphatic polyvalent alcohols can be listed.

The monovalent alcohol and the monovalent carboxylic acid having less than 7 or more than 22 carbon atoms are inferior in the lubricating performance thereof.

Listed as the monovalent alcohol having 7 to 22 carbon atoms are heptyl alcohol, octyl alcohol, nonyl alcohol, decyl alcohol, undecylic alcohol, lauryl alcohol, oleyl alcohol, stearyl alcohol, phenol, and alkylphenols such as methyl phenol and octyl phenol.

Listed as the monovalent carboxylic acid having 7 to 22 carbon atoms are a monovalent carboxylic acid obtained by replacing —$CH_2OH$ of the aliphatic monovalent alcohol with —COOH or a monovalent carboxylic acid obtained by replacing —OH of the aromatic monovalent alcohol with —COOH.

Listed as the aromatic polyvalent carboxylic acid are phthalic acid, isophthalic acid, terephthalic acid, trimellitic acid, trimesic acid, pyromellitic acid, diphenyltetracarboxylic acid, and benzophenonetetracarboxylic acid.

Listed as the aliphatic polyvalent alcohols are 1,3-butyleneglycol, glycerin, propylene glycol, ethylene glycol, pentadiol, diethylene glycol, polyethylene glycol, polypropylene glycol, trimethylol propane, pentaerythritol, dipentaerythritol, and sorbitol.

It is preferable to mix 70 to 95 wt % of the ester oil and 30 to 5 wt % of the urea compound to the total amount of the ester oil and the urea compound. By setting the mixing ratio thereof to this range, when the ester oil is added to the fluorine-containing grease, the grease enclosed in the bearing can be adjusted to have a preferable consistency at which it has a small leak amount and an excellent lubricating performance for a long time.

It is preferable to mix 0.1 to 60.0 wt % of the mixture of the ester oil and the diurea compound or the mixture of the ester oil and the urea compound to the total amount of the mixture and the fluorine-containing grease. By setting the mixing ratio of the mixture to this range, it is possible to restrain the reaction between the fluorine and the newly generated ferrous metal surface.

As other substances capable of restraining the reaction between the fluorine and the newly generated ferrous metal surface when added to the fluorine-containing grease, organic-acid metal salts are known.

As organic acids composing the organic-acid metal salts, it is possible to use any of aromatic organic acids, aliphatic organic acids, and alicyclic organic acids.

Listed as the organic acids are monovalent saturated aliphatic acid such as formic acid, acetic acid, propionic acid, butyric acid, valeric acid, caproic acid, heptanoic acid, 2-ethylhexylic acid, caprilic acid, pelargonic acid, capric acid, undecylic acid, lauric acid, tridecyl acid, myristic acid, pentadecyl acid, palmitic acid, margaric acid, stearic acid, nonadecyl acid, and arachic acid; monovalent unsaturated aliphatic acid such as acrylic acid, crotonic acid, undecylic acid, oleic acid, gadoleic acid; bivalent saturated aliphatic acid such as malonic acid, methylmalonic acid, succinic acid, methylsuccinic acid, dimethylmalonic acid, ethylmalonic acid, glutaric acid, adipic acid, dimethylsuccinic acid, pimelic acid, tetramethylsuccinic acid, suberic acid, azelaic acid, sebacic acid, brassylic acid; bivalent unsaturated aliphatic acid such as fumaric acid, maleic acid, oleic acid; derivatives of aliphatic acid such as tartaric acid and citric acid; aromatic organic acid such as benzoic acid, phthalic acid, trimellitic acid, and pyromellitic acid; and alicyclic organic acid such as naphthenic acid.

As metals composing the organic-acid metal salts, sodium, potassium, lithium, calcium, magnesium, and bismuth are listed.

Any of the organic-acid metal salts can be added to the fluorine-containing grease as a mixture of the organic-acid metal salt and synthetic oil such as ester oil.

It is preferable to use 0.1 to 30.0 wt % of any of the organic-acid metal salts for the total amount of the organic-acid metal salt and the fluorine-containing grease. By setting the mixing ratio of the organic-acid metal salt to this range, it is possible to restrain the reaction between the fluorine and the newly generated ferrous metal surface.

As other substances capable of restraining the reaction between the fluorine and the newly generated ferrous metal surface when added to the fluorine-containing grease, it is possible to list metal powder such as molybdate, bismuth, magnesium, and copper; metal oxides such as copper oxide, molybdenum oxide; inorganic bismuth compounds, and inorganic magnesium compounds.

By the addition of any of the above-described inorganic compounds to the fluorine-containing grease, the inorganic compound decomposes and reacts with the frictionally worn surface of the bearing portion and the like or on the newly generated ferrous metal surface exposed owing to wear, and is capable of forming the film with the iron oxide film.

The molybdate that can be used in the present invention is preferably a metal salt. As metals composing the metal salt, it is possible to list sodium, potassium, lithium, magnesium, calcium, copper, zinc, and barium. Of these molybdate, potassium molybdate and sodium molybdate are preferable in view of reactivity.

Listed as the inorganic bismuth which can be used for the lubricating grease of the present invention are bismuth powder, bismuth carbonate, bismuth chloride, bismuth nitrate, and hydrates thereof; bismuth sulfate, bismuth fluoride, bismuth bromide, bismuth iodide, bismuth oxyfluoride, bismuth oxychloride, bismuth oxybromide, bismuth oxyiodide, bismuth oxide, and hydrates thereof; bismuthhydroxide, bismuthselenide, bismuth telluride, bismuth phosphate, bismuth oxyperchlorate, bismuth oxysulfate, sodium bismuthate, bismuth titanate, bismuth zirconate, and bismuth molybdate. The inorganic bismuth especially preferable in the present invention is the bismuth sulfate which is excellent in heat resistance, durability, and hardly heat-decomposable and thus has a high extreme-pressure property effect.

These substances serving as the inorganic bismuth may be added to the grease singly or as a mixture of two kinds thereof.

Listed as inorganic magnesium that can be used for the lubricating grease of the present invention are magnesium powder, magnesium carbonate, magnesium chloride, magnesium nitrate, and hydrates thereof; magnesium sulfate, magnesium fluoride, magnesium bromide, magnesium iodide, magnesium oxyfluoride, magnesium oxychloride, magnesium oxybromide, magnesium oxyiodide, magnesium oxide, and hydrates thereof; magnesium hydroxide, magnesium selenide, magnesium telluride, magnesium phosphate, magnesium oxyperchlorate, magnesium oxysulfate, sodium magnesate, magnesium titanate, magnesium zirconate, and magnesium molybdate.

These substances serving as the inorganic magnesium may be added to the grease singly or as a mixture of two kinds thereof.

It is preferable to use 0.1 wt % to 30.0 wt % of any of the above-described inorganic substances for the total amount of the inorganic substance and the fluorine-containing grease. By setting the mixing ratio of any of the inorganic substances to this range, it is possible to restrain the reaction from occurring between the fluorine and the newly generated ferrous metal surface.

The lubricating grease of the present invention may contain known additives as necessary. Listed as the additives are antioxidants such as amine-based compounds, phenol-based compounds, phosphor-based compounds, and zinc dithiophosphate; extreme pressure agents such as chlorine-based compounds, sulfur-based compounds, phosphorous-based compounds, zinc dithiophosphate, organic molybdenum; metal inert agents such as benzotriazole; viscosity index-improving agents such as polymethacrylate, polyisobutylene, and polystyrene; wear-restraining agent; and detergent-dispersant.

These additives can be added to the grease singly or in combination of two or more kinds thereof.

The rolling bearing of the present invention has an inner ring and an outer ring disposed concentrically with each other; a plurality of rolling elements interposed between the inner ring and the outer ring; and a retainer holding the rolling elements. At least one of the inner ring, the outer ring, the rolling elements, and the retainer is composed of a ferrous metal material on which a newly generated surface is exposed owing to frictional wear of the bearing portion. The lubricating grease is enclosed on the periphery of the rolling elements.

Other rolling bearing of the present invention has an inner ring and an outer ring disposed concentrically with the inner ring; a plurality of rolling elements disposed between the inner ring and the outer ring; and a retainer holding the rolling elements. At least one of the inner ring, the outer ring, the rolling elements, and the retainer is composed of a ferrous metal material on which a surface is generated and exposed owing to frictional wear of the bearing portion. The fluorine-containing grease is enclosed on the periphery of the rolling elements. In this bearing, a resin layer is formed on the surfaces of the rolling elements or/and the contact surface of the retainer which dividedly holds the rolling elements with the retainer in contact with the rolling elements; the retainer is entirely made of resin; or the rolling elements are made of ceramics.

It is preferable that the fluorine-containing grease contains the PFPE oil as the base oil thereof and the fluorocarbon resin powder as the thickener thereof and that the evaporation rate of the fluorine-containing grease at 200° C. after it is left for 24 hours is 0.1 to 15 wt %. When the evaporation rate is less than 0.1 wt %, the torque becomes large owing to a high viscosity. When the evaporation rate is more than 15 wt %, the amount of the grease is liable to be insufficient during the use of the bearing and thus the life of the bearing becomes short.

The fluorine-containing grease may be the lubricating grease to which the above-described additives added.

Description is made on the case in which the resin layer is formed on the surfaces of the rolling elements or/and on the contact surface of the retainer which dividedly holds the rolling elements with the retainer in contact with the rolling elements.

Synthetic resin composing the resin layer is not limited to a specific one, provided that the synthetic resin is oil resistant, high in a film strength, and excellent in the wear resistance thereof. Examples of the synthetic resins having the above-described properties include thermosetting resin such as epoxy resin, phenol resin, polycarbodiimide resin, furan resin, bismaleimidetriazine resin, unsaturated polyester resin, silicone resin, polyaminobismaleimide resin, and aromatic polyimide resin; and thermoplastic resin such as polyolefin resin, polyacetal resin, polyamide resin, polyphenylene ether resin, phenylene sulfide resin, polysulfone resin, polyether sulfone resin, polyether imide resin, thermoplastic polyimide resin, polyamide-imide resin, polybenzimidazole resin, polyether ketone resin, polyether nitrile resin, fluorocarbon resin, and aromatic polyester resin. Of these synthetic resins, considering that the bearing of the present invention is used at a high temperature, the polyimide resin, the polyamide-imide resin, the epoxy resin, the phenol resin, the polyphenylene sulfide resin, and the polyether ketone resin are listed. Various fillers fibrous or granular can be added to these synthetic resins as necessary.

In the present invention, especially preferable synthetic resin is aromatic polyimide-based resin excellent in its film-forming performance. The aromatic polyimide-based resin has an imide ring directly bonded to a benzene ring in its molecules. As the aromatic polyimide-based resin, aromatic polyimide resin, aromatic polyamide-imide resin, and the like are listed.

The aromatic polyimide resin has a repeating unit shown by the chemical formula 7. It is possible to use polyamic acid which is the precursor of the resin having the repeating unit shown by the chemical formula 7. $R_4$ is a residue group of aromatic tetracarboxylic acid or its derivatives. $R_5$ is a residue group of the aromatic diamine or its derivatives. Listed as the $R_4$ or $R_5$ are aromatic groups such as phenyl group, naphthyl group, and diphenyl group, and groups having the phenyl group, the naphthyl group, or/and the diphenyl group connected with a connecting group such as methylene group, ether group, carbonyl group or sulfone group.

[Chemical formula 7]

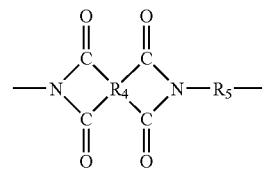

Listed as the aromatic tetracarboxylic acid or its derivatives are pyromellitic dianhydride, 2,2',3,3'-biphenyltetracarboxylic dianhydride, 3,3',4,4'-biphenyltetracarboxylic dianhydride, 3,3',4,4'-benzophenonetetracarboxylic dianhydride, 1,2,5,6-naphthalenetetracarboxylic dianhydride, bis(2,3-dicarboxyphenyl) methanoic dianhydride, and the like. These substances are used singly or as mixtures.

Listed as examples of the aromatic diamine or its derivatives are diamines such as 4,4'-diaminodiphenyl ether, 3,3'-diaminodiphenyl sulfone, 4,4'-diaminodiphenylmethane, methaphenylenediamine, paraphenylenediamine, 2,4-diaminotoluene, 2,6-diaminotoluene, 4,4'-bis(3-aminophenoxy) biphenyl ether; and diisocyanates which are derivatives thereof.

As examples of the aromatic polyimide resin obtained by the combination of the aromatic tetracarboxylic acid or its derivatives and the aromatic diamine or its derivatives, those having a repeating unit shown in the chemical formula 8 are listed. These resins do not have hetero atoms in $R_4$ and $R_5$.

[Chemical Formula 8]

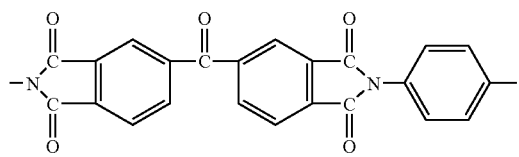

(1)

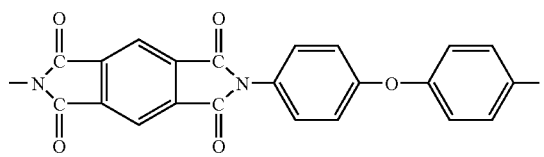

(2)

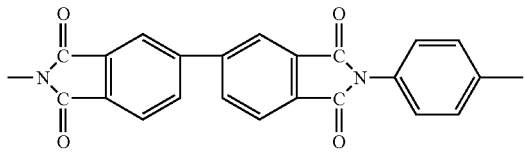
(3)

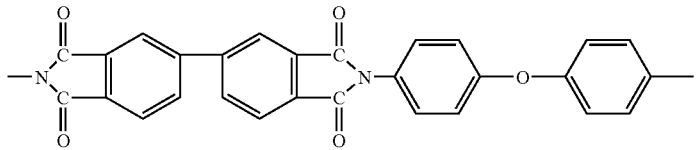
(4)

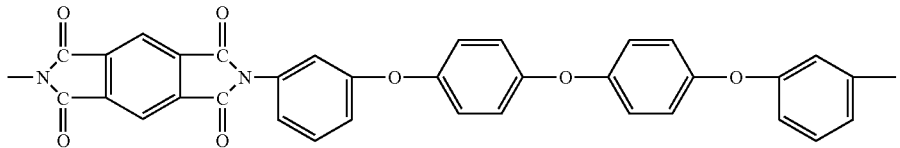
(5)

In the aromatic polyimide resin shown in the chemical formula 8, the polyimides shown by the formulas (3) and (4) in which the ratio of the aromatic ring in the molecule thereof is high are preferable. The polyimide shown by the chemical formula (4) is especially suitable for the present invention.

As a commercially available article of the aromatic polyimide resin varnish, "U-varnish" produced by Ube Industries, Ltd. is exemplified.

The aromatic polyamide-imide resin has a repeating unit shown by the chemical formula 9. $R_6$ is a residue group of aromatic tricarboxylic acid or its derivatives. $R_7$ is a residue group of the aromatic diamine or its derivatives. Listed as the $R_6$ or $R_7$ are aromatic groups such as phenyl group, naphthyl group, and diphenyl group; and aromatic groups consisting of the phenyl group, the naphthyl group, or/and the diphenyl group connected with each other through a connecting group such as methylene group, ether group, thioether group, carbonyl group, sulfone group or/and ester group or through a connecting group consisting of these groups connected with each other or through hydrocarbon groups having 1 to 6 carbon atoms.

[Chemical formula 9]

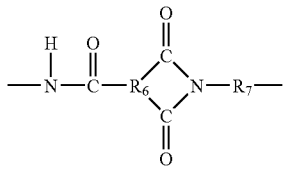

Listed as examples of the aromatic tricarboxylic acid or its derivatives are trimellitic anhydride, 2,2',3-biphenyltricarboxylic anhydride, 3,3',4-biphenyltricarboxylic anhydride, 3,3',4-benzophenonetricarboxylic anhydride, 1,2,5-naphthalenetricarboxylic anhydride, 2,3-dicarboxyphenylmethylbenzoic anhydride, and the like. These aromatic tricarboxylic acids are used singly or as mixtures.

Listed as examples of the aromatic diamine or its derivatives are diamines such as 4,4'-diaminodiphenyl ether, 3,3'-diaminodiphenyl sulfone, 4,4'-diaminodiphenylmethane, methaphenylenediamine, paraphenylenediamine, 2,4-diaminotoluene, 2,6-diaminotoluene; and diisocyanates which are derivatives thereof.

It is possible to use an aromatic polyamide structure, and an aromatic polyamide-imide and a polyamide copolymer both containing an aliphatic polyamide structure in the molecules thereof.

Unlike the aromatic polyimide resin, the aromatic polyamide-imide resin which has the state of a resin solution without undergoing a precursor and has a repeating unit shown by the chemical formula 9 is especially preferable in the present invention. It is also possible to use aromatic polyamide-imide resin modified with diisocyanate, BPDA, sulfone; and rubber-modified resin.

The method of producing the aromatic polyamide-imide resin is known, as disclosed in patent publications such as U.S. Pat. No. 3,625,911, Examined Japanese Patent Application No. 50-33120, and the like. For example, the aromatic polyamide-imide resin is obtained by allowing a reaction between aromatic tricarboxylic anhydride or its derivative and organic diamine or its derivative in an organic polar solvent such as dimethylacetamide, dimethylformamide or N-methylpyrrolidone at a predetermined temperature for a predetermined period of time.

As aromatic polyamide-imide resin varnish commercially available, HPC4250 (registered trademark) produced by Hitachi Chemical Co., Ltd. is exemplified. As the resin, TORLON (registered trademark) produced by Amoco Inc. of U.S.A. is exemplified.

The coefficient of linear expansion of the resin layer made of the synthetic resin is preferably not more than $1 \times 10^{-4}/°$ C. and more preferably not more than $0.8 \times 10^{-4}/°$ C. If the coefficient of linear expansion of the resin layer is larger than $1 \times 10^{-4}/°$ C., there is a large temperature-caused difference in the dimensional change between the retainer made of metal and the film. Thus there is a possibility that owing to a heat shock or the like, the interface between the film and the base material peels off.

The resin layer made of the synthetic resin can be formed by the following method: Initially the base material of the rolling element and the retainer are sufficiently cleaned to remove pollutants on the surface thereof. As the cleaning method, immersion cleaning by using an organic solvent, ultrasonic wave cleaning, vapor cleaning, and acid-alkali cleaning are listed.

Thereafter when the synthetic resin is powder, the synthetic resin is formed on the surface of the retainer by a fluidization dip method, an electrostatic deposition method or a tumbler coating method. When the synthetic resin is liquid or soluble in an appropriate solvent, a spray coating method or a dip (immersion) coating method is used to do so. The thickness of the film is preferably 0.1 μm to 100 μm and more preferably 0.5 μm to 50 μm. In the process of forming the film, an extra amount of the synthetic resin material which has attached to the surface of the retainer is wiped off and removed by a physical method such as centrifugal separation, air blow or the like or a chemical method. In this manner, the thickness of the film can be adjusted to a desired thickness. When the thickness of the film is less than 0.1 μm, the film disappears at the stage when the rolling bearing starts to be used, and the durability thereof is insufficient. If the thickness of the film is more than 100 μm, a temperature-caused change in the gap between the rolling element and the film becomes large, which adversely affects the rotational torque.

After the film is formed, solvent removal, drying, fusion, and crosslinking are performed by treatment corresponding to the properties of resin, for example, heating treatment, ultraviolet ray irradiation treatment or the like to complete the production of the rolling element and the retainer having the resin layer formed on the surface thereof. To increase the thickness of the film, recoating may be carried out. It is possible to perform mechanical processing, tumbler treatment or the like after the formation of the film is completed.

Description is made below on the case in which the retainer of the rolling bearing of the present invention dividedly holding the rolling elements is entirely made of resin.

The synthetic resin composing the retainer is not limited to a specific one, provided that it has resistance to oil, a high mechanical strength, and excellent wear resistance. As examples of the synthetic resin, it is possible to list polyethylene resin such as low-density polyethylene, high-density polyethylene, an ultra-high-molecular-weight polyethylene; modified polyethylene resin, water-bridged polyolefin resin, polyamide resin, aromatic polyamide resin, polystyrene resin, polypropylene resin, silicone resin, urethane resin, polytetrafluoroethylene resin, chlorotrifluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide (PPS) resin, polyether sulfone resin, polyether imide resin, polyamide-imide (PAI) resin, PEEK resin, thermoplastic PI resin, thermosetting PI resin, epoxy resin, phenol resin, unsaturated polyester resin, vinyl ester resin, and the like. It is also possible to exemplify mixtures each consisting of not less than two kinds of the above-described synthetic resins, namely, polymer alloys.

Various fillers fibrous or granular can be added to these synthetic resins as necessary. As the fibrous fillers, glass fiber and carbon fiber are preferable. When importance is particularly attached to strength and wear resistance, the carbon fiber is preferable.

The synthetic resin especially preferable in the present invention is the polyamide resin, the PEEK resin, the polyphenylene sulfide resin, the PI-based resin, and the phenol resin. When the rolling bearing is used at a high temperature, the PI resin, the PEEK resin, and mixed resin of the PAI and the PPS excellent in resistance to heat are preferable.

The polyamide resin is a general term of linear polymers containing amide group in the molecular structure thereof and a representative resin of engineering plastics. Listed as the polyamide resin are aliphatic polyamide resin such as polyhexamethylene adipamide (6,6-nylon), polycaprolactam (6-nylon); and aromatic polyamide resin such as polymethaphenyleneisophthalamide, polyparaphenyleneterephthalamide, polymethaxyleneadipamide (nylon MXD-6), and a condensation polymer (9T nylon) of 1,9-nonandiamide and terephthalic acid. These polyamide resins can be used singly or as mixtures.

The PEEK resin is aromatic thermoplastic resin crystalline and having a polymer structure in which the benzene rings are linked with the rigid carbonyl group at the para position by the flexible ether linkage. The PEEK resin is engineering plastics having excellent heat resistance, shock resistance, and wear resistance•sliding property. The structure of the PEEK resin is shown by the chemical formula 10. As a commercially available article, PEEK150P (commercial name, produced by VICTREX Plc.) is exemplified.

[Chemical formula 10]

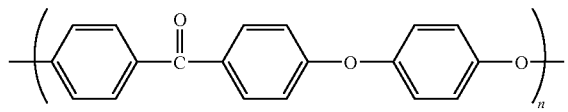

The PPS resin is a crystalline thermoplastic resin having a polymer structure, shown by the chemical formula 11, in which the benzene rings are linked with each other at the para position by a sulfur linkage. As commercially available articles of the PPS resin, T4AG (commercial name, produced by Toplen Co., Ltd.), B160 (commercial name, produced by Tosoh Corporation), and KPS W214 (commercial name, produced by Kureha Chemical Industry Co., Ltd.) are listed.

[Chemical formula 11]

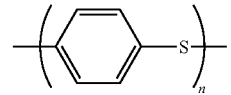

The PI-based resin is a representative resin of highly heat-resistant engineering plastics synthesized from aromatic diamine and aromatic tetracarboxylic dianhydride and is high in its rigidity and excellent in its dimensional stability. The structure of the PI-based resin is shown in the chemical formula 12. As commercially available articles of the PI-based resin, it is possible to list AURUM (commercial name, produced by Mitsui Chemicals, Inc.), Vespel (commercial name, produced by DuPont), and Upilex (commercial name, produced by Ube Industries, Ltd.).

[Chemical formula 12]

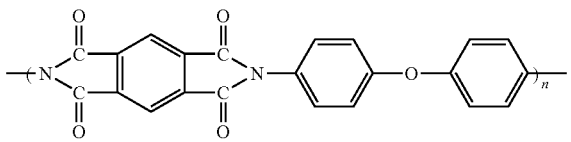

The phenol resin is a thermosetting resin obtained by reaction between phenol and formaldehyde and excellent in its heat resistance, durability, electrical insulating property, resistance to oil and acid. The structure of the phenol resin is shown in the chemical formula 13. As commercially available articles of the phenol resin, it is possible to list Sumilite Resin (commercial name, produced by Sumitomo Bakelite Co, Ltd.). This can be used with woven cloth of cotton to form a laminate.

[Chemical formula 13]

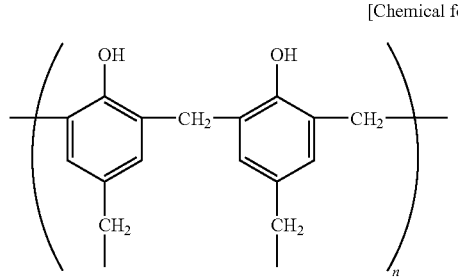

The polyamide-imide resin (hereinafter referred to as PAI) that is used in the present invention is shown by the following chemical formula 14. $R_8$ is an aromatic group including at least one benzene ring. Two carbonyl groups are connected with adjacent carbon atoms in the benzene ring of $R_8$. In addition to this structure, the PAI that is used in the present invention may be copolymerized with a compound containing other amide bond.

[Chemical formula 14]

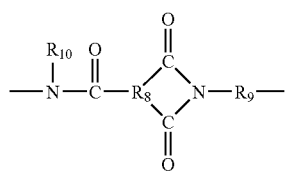

(In the chemical formula 14, $R_8$ represents trivalent aromatic group including at least one benzene ring, $R_9$ represents bivalent organic group, and $R_{10}$ represents hydrogen atom, methyl group, or phenyl group.)

A preferable example of $R_8$ in the chemical formula 14 is as shown in the following chemical formula 15:

[Chemical formula 15]

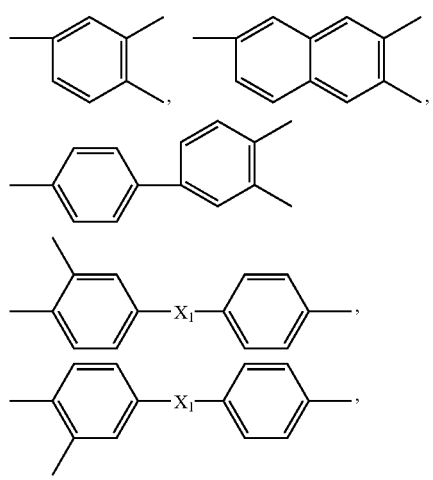

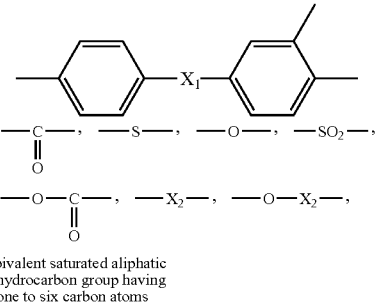

$X_1$: —C—, —S—, —O—, —SO$_2$—,
       ||
       O

—O—C—, —$X_2$—, —O—$X_2$—,
   ||
   O $X_2$: bivalent saturated aliphatic hydrocarbon group having one to six carbon atoms Listing preferable examples of $R_9$ in the chemical formula 14, —(CH$_2$)$_u$— (in the formula, u represents saturated aliphatic hydrocarbon group having 4 to 12 carbon atoms) and the one shown in the following chemical formula 16.

[Chemical formula 16]

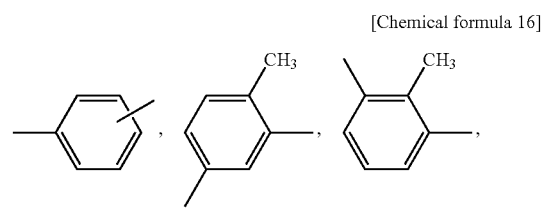

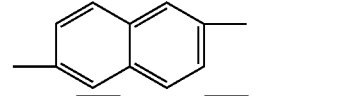

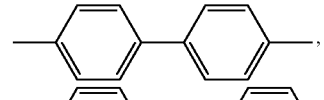

$X_3$: —O—, —S—, —SO$_2$—, —C$_Y$H$_{2Y}$—, —N—
                                                |
                                                $X_4$

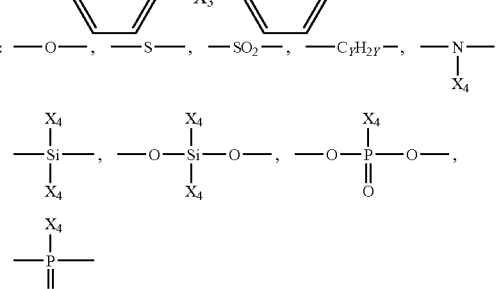

(in the formula, Y represents integers 1 through 3, $X_4$ represents aliphatic hydrocarbon group or aromatic group having one to six carbon atoms.)

It is preferable to copolymerize units having the following structures with these PAI resins because the compatibility of the PAI resin with the PPS and fusing and flowing performances are improved.

[Chemical formula 17]

[Chemical formula 18]

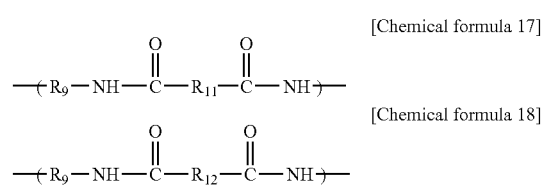

$R_{11}$ in the chemical formula 17 represents bivalent aromatic group. An example thereof is shown in the following chemical formula 19.

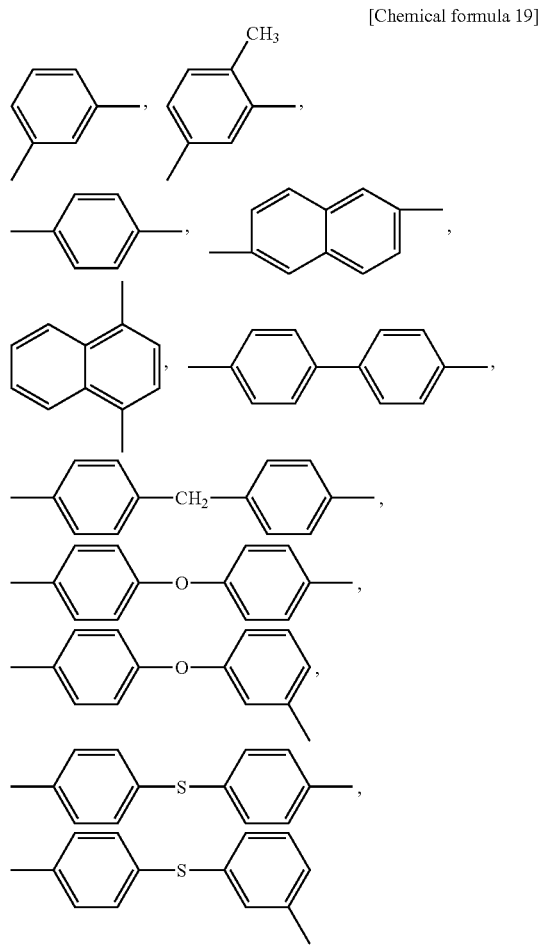

[Chemical formula 19]

$R_{12}$ in the chemical formula 18 represents a bivalent aliphatic group. An example thereof is —$(CH_2)_v$—. In a preferable —$(CH_2)_v$—, v=2 through 12. In a more favorable —$(CH_2)_v$—, v=4 through 12.

It is preferable that a copolymer having the structure shown by the chemical formula 14 and the structure shown by the chemical formula 17 has a composition including 10 to 70 mol % of the chemical formula 14 and 90 to 30 mol % of the chemical formula 17 for 100 mol % which is the total of the structures of the chemical formulas 14 and 17.

It is preferable that a copolymer having the structure shown by the chemical formula 14 and the structure shown by the chemical formula 18 has a composition including 10 to 50 mol % of the chemical formula 14 and 90 to 50 mol % of the chemical formula 18 for 100 mol % which is the total of the structures of the chemical formulas 14 and 18.

It is preferable that a copolymer having the structure shown by the chemical formula 14, the structure shown by the chemical formula 17, and the structure shown by the chemical formula 18 has a composition including 10 to 70 mol % of the chemical formula 14, 1 to 89 mol % of the chemical formula 17, and 1 to 70 mol % of the chemical formula 18 for 100 mol % which is the total of the structures of the chemical formulas 14, 17, and 18. The above-described copolymers may have any of random, block, and alternate arrangements.

The method of producing the PAI as described above is known, as disclosed in patent publications such as U.S. Pat. No. 3,625,911 and Examined Japanese Patent Application No. 50-33120, and the like. For example, polyamide acid is obtained by allowing a reaction between aromatic tricarboxylic anhydride shown by the following chemical formula 20 or its derivative and organic diamine shown by $H_2N$—$R_9$—$NH_2$, OCN—$R_9$—NCO ($R_9$ in the formula is the same as $R_9$ described in the chemical formulas 14 or 16) or its derivative in an organic polar solvent such as dimethylacetamide, dimethylformamide, or N-methylpyrrolidone at a predetermined temperature for a predetermined period of time. The obtained polyamide acid is converted to an imide state by using a heating method or other method.

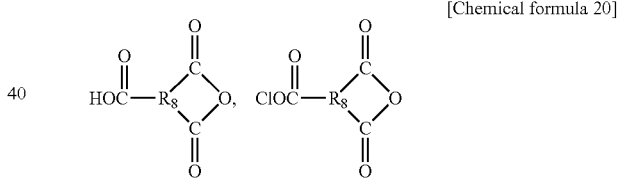

[Chemical formula 20]

The PAI produced in this method is shown in the following chemical formula 21. As a commercially available article, TORLON (registered trademark) produced by Amoco Inc. of U.S.A. is exemplified.

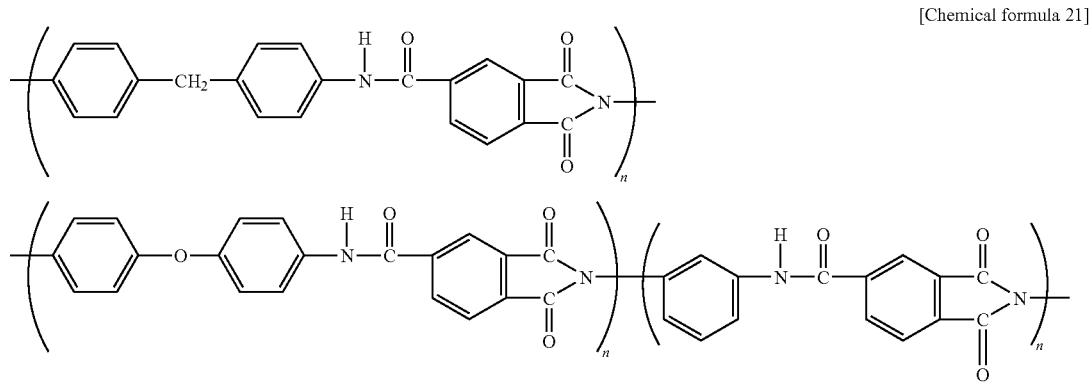

[Chemical formula 21]

-continued

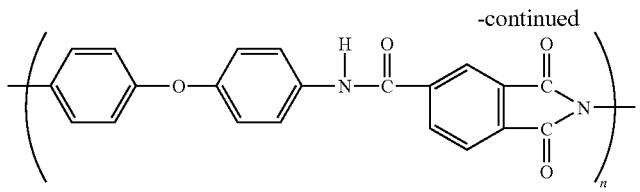

The PAI obtained by carrying out the above-described method is inferior in fusing and flowing performances. Thus to obtain PAI higher in flowability, it is preferable to adopt a method of producing the PAI from aromatic tricarboxylic anhydride and diisocyanate. In polymerization, as disclosed in Japanese Patent Application Laid-Open No. 6-322060, it is more preferable to allow them to react with each other in a condition allowing amidation and imidization to be progressed in a stepwise manner.

To improve the compatibility between the PAI and the PPS, it is possible to use a precursor of the polyamide-imide and add an isocyanate compound as a third component.

The PAI is used in combination with the PPS. The mixing ratio of the PAI is 5 to 65 vol %. When the mixing ratio of the PAI is less than 5 vol %, creep resistance at a high temperature cannot be sufficiently improved. When the mixing ratio of the PAI is as large as more than 65 vol %, the high moldability of the PPS to be combined therewith cannot be sufficiently utilized and thus the flowability thereof in a fused state deteriorates. Thus it is difficult to perform injection molding. In consideration of forcible demolding (undercut) at an injection molding time and incorporatability of the retainer into the bearing, it is preferable that the PPS to be combined with the PAI is of a semi-crosslinking (semi-linear) type or a straight chain (linear) type.

The case in which the rolling element of the rolling bearing of the present invention is made of ceramics is described below.

As the material of ceramics, silicon nitride, silicon carbide, aluminum oxide (alumina), zirconium oxide (zirconia), sialon are listed. The surface of the alumina is comparatively high in its chemical activity and thus unpreferable as the material of the rolling element of the bearing.

Of the above-described ceramics, the silicon nitride is most preferable in view of the fatigue life of the rolling element. The ceramic rolling element can be obtained by polishing a ball obtained by carrying out a molding method such as HIP (hot isostatic pressing) and gas pressure sintering. Although it is essential in the present invention that the rolling element is composed of the ceramics, it is possible to make the inner ring and the outer ring of ceramics.

An example of the rolling bearing of the present invention is shown in FIG. 1. FIG. 1 is a sectional view showing a deep groove ball bearing.

The rolling bearing 1 has an inner ring 2 having an inner ring rolling surface 2a on an outside surface thereof; an outer ring 3, having an outer ring rolling surface 3a on an inside surface thereof, disposed concentrically with the inner ring 2; a plurality of rolling elements 4 disposed between the inner ring rolling surface 2a and the outer ring rolling surface 3a; a retainer 5 holding the plurality of rolling elements 4; and a sealing member 6 fixed to the outer ring 3 and the like. Lubricating grease 7 is enclosed essentially on the periphery of the rolling elements 4.

When the resin layer is formed on the surfaces of the rolling elements or/and on the contact surface of the retainer which dividedly holds the rolling elements with the retainer in contact with the rolling elements, the resin layer is formed on the surface of the rolling elements 4 or/and on the surface of the retainer 5. When the retainer is entirely made of resin, the retainer 5 is made of the resin. At this time, the resin on the surface of the rolling elements 4 or the retainer 5 prevents the rolling elements or/and the retainer from contacting the fluorine contained in the grease.

When the rolling elements 4 are made of ceramics, the fluorine-containing grease 7 is enclosed on the periphery of the rolling elements 4. Because the rolling elements 4 are made of ceramics, the rolling elements 4 do not react with the fluorine.

The rolling bearing of the present invention is not limited to a specific type, but includes a deep groove ball bearing, an angular ball bearing, a thrust ball bearing, a roller bearing, needle-shaped roller bearing (radial, thrust), a tapered roller bearing, and the like. Although various methods for producing the retainer made of resin can be adopted, it is preferable to adopt injection molding having a favorable productivity. Regarding the configuration of the retainer, a crown type which is the most common as the ball bearing or a machined type can be used. A basket type or a comb type can be used as the roller bearing. The basket type can be used as the tapered roller bearing.

Except the case where the entire retainer is made of resin, as the base material for the retainer, a corrugated retainer made of an iron plate such as an SPCC (cold rolled steel plate), a pressed retainer, and the machined retainer are listed.

Regarding sealing, in addition to an iron plate shield, a rubber seal of contact type or a noncontact type can be used as usage. Because the bearing of the present invention is intended to be used at a high temperature, it is desirable to use fluoro rubber as the rubber.

EXAMPLES

Reference Example 1

Preparation of Grease 1

33 wt % of fluorocarbon resin powder (commercial name: Vydax produced by DuPont) was added to 67 wt % of PFPE oil (commercial name: Krytox 143AC produced by DuPont, kinematic viscosity: 191 mm² at 40° C.) for the total wt % of grease. After being stirred, it was supplied to a roll mill to obtain a semisolid grease 1 containing the fluorocarbon resin powder as its thickener and the PFPE oil as its base oil.

Reference Example 2

Diurea Compound

After one mol of diphenylmethane diisocyanate and two mols of octylamine were dissolved in hexane, stirring of the solution was continued at 40° C. for 30 minutes with the solution circulating to allow a reaction therebetween. Thereby a diurea compound was deposited in the hexane.

After the hexane was evaporated, it was crushed in a mortar to obtain diurea compound powder.

Reference Example 3

Mixture of Diurea Compound and Ester Oil

One mol of diphenylmethane diisocyanate was dissolved in a half amount of 88 wt % of aromatic ester oil (kinematic viscosity: 91 mm² at 40° C.) for the total wt % of grease. Two mols of monoamine was dissolved in the remaining half amount of the aromatic ester oil. Thereafter the solution of the aromatic ester oil in which the monoamine was dissolved was added to the solution of the aromatic ester oil in which the diphenylmethane diisocyanate was dissolved, while being stirred. The monoamine and the diphenylmethane diisocyanate were allowed to react with each other, while stirring was continued at 100 to 120° C. for 30 minutes. As a result, 12 wt % of a diurea compound was deposited in the aromatic ester oil serving as the base oil. Thereafter the solution was supplied to the roll mill to obtain a semisolid substance which is the mixture of the diurea compound and the ester oil.

Examples 1 Through 3 and Comparative Example 1

Above-described grease and the like were mixed with each other at the ratios as shown in table 1 and stirred to obtain lubricating grease of each of the examples 1 through 3 and the comparative example 1. Each mixing ratio is shown by wt % for the total wt % of the grease.

The worked penetration and dropping point of each obtained mixed grease were measured. The worked penetration and the dropping point were found in conformity to JIS K2220. Table 1 shows the results.

The lubricating grease of each example was enclosed in a bearing 6204ZZ cleaned with petroleum benzine at 38% of the entire spatial volume thereof to prepare a rolling bearing of each example. The bearing 6204ZZ (produced by NTN Corporation) is a deep groove ball bearing. High-carbon chromium bearing steel is used for the bearing portion. The durability of each rolling bearing at a high temperature was evaluated in a test conducted in conditions shown below.
<High-Temperature Durability Test>

In a high-temperature durability test, the rolling bearing was rotated at a radial load of 67N, a thrust load of 67N, 10000 rpm, and an atmospheric temperature of 200° C. The period of time it took for the motor to stop owing to an overload was measured. The test period of time was 3000 hours at maximum. Table 1 shows the results.

TABLE 1

|  | Example | | | Comparative |
| --- | --- | --- | --- | --- |
|  | 1 | 2 | 3 | example 1 |
| Components (wt %) | | | | |
| Reference example 1: PFPE oil/Fluorocarbon resin powder: 67/33 | 84 | 40 | 97 | 100 |
| Reference example 2: Aliphatic diurea compound | 16 | — | — | — |
| Reference example 3: Ester oil/Diurea compound: 88/12 | — | 60 | — | — |
| Sodium sebacate | — | — | 3 | — |
| Properties | | | | |
| Worked penetration | 220 | 352 | 280 | 282 |
| Dropping point (° C.) | ≧250 | ≧250 | ≧250 | ≧250 |

TABLE 1-continued

|  | Example | | | Comparative |
| --- | --- | --- | --- | --- |
|  | 1 | 2 | 3 | example 1 |
| High-temperature durability test (hour) | >3000 | >3000 | 2500 | 1700 |

As shown in table 1, each of the lubricating grease of the examples 1 through 3 was superior to that of the comparative example 1 in the high-temperature durability test.

Examples 4 and 5 and Comparative Example 2

The components shown in table 2 were mixed with each other at the ratios as shown in table 2 and stirred to obtain lubricating grease of each of the examples 4 and 5 and the comparative example 2. Each mixing ratio is shown by wt % for the total wt % of the grease.

The worked penetration and dropping point of each obtained mixed grease (example 4 and comparative example 2) were measured. The worked penetration and the dropping point were found in conformity to JIS K2220. Table 2 shows the results.

The lubricating grease of each example was enclosed in the bearing 6204ZZ cleaned with the petroleum benzine at 38% of the entire spatial volume thereof to prepare a rolling bearing of each example. Each obtained rolling bearing was evaluated in the above-described high-temperature durability test. Table 2 shows the results.

TABLE 2

|  | Example | | Comparative |
| --- | --- | --- | --- |
|  | 4 | 5 | example 2 |
| Components (wt %) | | | |
| Reference example 1: PFPE oil/Fluorocarbon resin powder: 67/33 | 95 | 95 | 100 |
| Potassium molybdate | 5 | — | — |
| Bismuth sulfate | — | 5 | — |
| Properties | | | |
| Worked penetration | 265 | — | 282 |
| Dropping point (° C.) | ≧250 | — | ≧250 |
| High-temperature durability test (hour) | 2400 | 2200 | 1700 |

As shown in table 2, each of the lubricating grease of the examples 4 and 5 was superior to that of the comparative example 2 in the high-temperature durability test.

Reference Example 4

Preparation of Grease 2

33 wt % of fluorocarbon resin powder (commercial name: Vydax produced by DuPont) was added to 67 wt % of PFPE oil (commercial name: Krytox GPL105 produced by DuPont, kinematic viscosity: 160 mm²/sec at 40° C.) for the total wt % of grease. After being stirred, it was supplied to the roll mill to obtain a semisolid grease 2 containing the fluorocarbon resin powder as its thickener and the PFPE oil as its base oil. The worked penetration of the grease 2 was 280, and the evaporation rate thereof was 6.5 wt %. To measure the evaporation rate of the grease, the grease is applied to a glass plate having a length of 80 mm×a width of 60 mm×a thickness of 3 mm to form a configuration of a length of 55 mm×a width of 35 mm×a thickness of 1 mm by using a thickness gauge. Thereafter a weight decrease rate is measured after the grease is left for 24 hours in a constant-temperature chamber at 200° C. An obtained weight decrease rate is set as the evaporation rate.

Reference Example 5

Preparation of Grease 3

33 wt % of fluorocarbon resin powder (commercial name: Vydax produced by DuPont) was added to 67 wt % of PFPE oil (commercial name: Fomblin 143AC produced by Solvay S.A., kinematic viscosity: 159 mm$^2$/sec at 40° C.) for the total wt % of grease. After being stirred, it was supplied to the roll mill to obtain a semisolid grease 3 containing the fluorocarbon resin powder as its thickener and the PFPE oil as its base oil. The worked penetration of the grease 3 was 280, and the evaporation rate thereof was 3.2 wt %.

Reference Example 6

Preparation of Grease 4 (Urea Grease)

One mol of the diphenylmethane diisocyanate was dissolved in a half amount of 88 wt % of the aromatic ester oil (kinematic viscosity: 91 mm$^2$/sec at 40° C.) for the total amount of grease. Two mols of the monoamine was dissolved in the remaining half amount of the aromatic ester oil. Thereafter the solution of the aromatic ester oil in which the monoamine was dissolved was added to the solution of the aromatic ester oil in which the diphenylmethane diisocyanate was dissolved, while being stirred. The monoamine and the diphenylmethane diisocyanate were allowed to react with each other, while stirring was continued at 100 to 120° C. for 30 minutes. As a result, 12 wt % of a urea compound was deposited in the aromatic ester oil serving as the base oil. Thereafter the solution was supplied to the roll mill to obtain a semisolid grease 4 (urea grease) which was the mixture of the diurea compound and the ester oil. The worked penetration of the grease 4 was 290.

Reference Example 7

Preparation of Grease 5

33 wt % of fluorocarbon resin powder (commercial name: Vydax produced by DuPont) was added to 67 wt % of fluorine-containing oil (commercial name: Krytox GPL104 produced by DuPont, kinematic viscosity: 60 mm$^2$/sec at 40° C.) for the total wt % of grease. After being stirred, it was supplied to the roll mill to obtain a semisolid grease 5 containing the fluorocarbon resin powder as its thickener. The worked penetration of the grease 5 was 280, and the evaporation rate thereof was 35.8 wt %.

<Formation of Resin Layer 1 (for Rolling Element)>

A ball (5/16 inches) made of SUJ2 was coated with aromatic polyamide-imide resin varnish (HPC-4250 produced by Hitachi Chemical Co., Ltd., solvent: N-methyl-2-pyrrolidone) by using a dipping method. After the aromatic polyamide-imide resin varnish was applied to the ball, it was dried for one hour at 100° C. and calcined for one hour at 180° C. The thickness of the film was set to 5 μm by adjusting the number of dipping times.

<Formation of Resin Layer 2 (for Retainer)>

A pressed corrugated retainer made of SPCC was coated with aromatic polyamide-imide resin varnish (HPC-4250 produced by Hitachi Chemical Co., Ltd., solvent: N-methyl-2-pyrrolidone) by using the dipping method. After the aromatic polyamide-imide resin varnish was applied to the retainer, it was dried for one hour at 100° C. and calcined for one hour at 180° C. The thickness of the film was set to 5 μm by adjusting the number of dipping times. The retainer was incorporated in the bearing with a rivet.

Examples 6 Through 9 and Comparative Examples 3 and 4

By using bearings each having a construction shown in table 3 and grease shown in table 3, specimen rolling bearings were prepared. The obtained specimen rolling bearings were evaluated in the above-described high-temperature durability test. Table 3 shows the results.

TABLE 3

|  | Example | | | | Comparative example | |
| --- | --- | --- | --- | --- | --- | --- |
|  | 6 | 7 | 8 | 9 | 3 | 4 |
| Construction of bearing | | | | | | |
| Resin layer 1 (for rolling element) | Formed | Not formed | Formed | Formed | Not formed | Not formed |
| Rolling element | SUJ2 | SUJ2 | SUJ2 | SUJ2 | SUJ2 | SUJ2 |
| Resin layer 2 (for retainer) | Not formed | Formed | Formed | Formed | Not formed | Not formed |
| Retainer | Corrugated SPCC | Corrugated SPCC | Corrugated SPCC | Corrugated SPCC | Corrugated SPCC | Corrugated SPCC |
| Inner and outer rings | SUJ2 | SUJ2 | SUJ2 | SUJ2 | SUJ2 | SUJ2 |
| Enclosed grease | Grease 2 | Grease 2 | Grease 2 | Grease 3 | Grease 2 | Grease 3 |
| Base oil | PFPE oil (side chain) | PFPE oil (side chain) | PFPE oil (side chain) | PFPE oil (straight-chain) | PFPE oil (side chain) | PFPE oil (straight-chain) |
| Thickener | Fluorocarbon resin | Fluorocarbon resin | Fluorocarbon resin | Fluorocarbon resin | Fluorocarbon resin | Fluorocarbon resin |
| Endurance time at high temperature (hour) | 3100 | 2800 | 3200 | 2400 | 1700 | 1200 |

As shown in table 3, the rolling bearing of each of the examples 6 through 9 in which a resin layer was formed on the rolling element or/and the retainer was superior to the rolling bearings of the comparative examples in the high-temperature durability test.

Examples 10 and 12

By using bearings 6204 each having a construction shown in table 4 and grease shown in table 4, specimen rolling bearings were prepared. A crown type retainer formed by injection-molding PEEK resin (PEEK450C produced by VICTREX Plc) containing 30 wt % of carbon fiber was used. SUJ2 was used to make the inner and outer rings and the rolling element. The seal consisted of an iron plate shield.

The grease of each example was enclosed in the bearing 6204ZZ cleaned with petroleum benzine at 38 vol % of the entire spatial volume thereof to prepare a rolling bearing of each example. Each obtained rolling bearing was evaluated in the above-described high-temperature durability test. Table 4 shows the results.

Example 11

Except that polyimide resin (Aurum produced by Mitsui Chemicals Inc.) was used as the material for a retainer, a rolling bearing was prepared in a manner similar to that of the example 10. The high-temperature durability test was conducted. Table 4 shows the results.

Example 13

50 mol % of trimellitic anhydride and 50 mol % of 2,4-tolylene diisocyanate both used as the material of the aromatic polyamide-imide resin were polymerized in N-methylpyrrolidone. Except a resin mixture of 30 parts by weight of the aromatic polyamide-imide resin which was obtained from the synthesized resin solution, 25 parts by weight of glass fiber, and 45 parts by weight of PPS (linear type PPS LR-03 produced by Dainippon Ink and Chemicals Incorporated) was used, the rolling bearing was prepared in a manner similar to that of the example 10. The high-temperature durability test was conducted. Table 4 shows the results.

Comparative Examples 5 and 6

By using the bearing 6204 having a construction shown in table 4 and grease shown in table 4, a specimen rolling bearing of each comparative example was prepared. A high-temperature durability test was conducted in a manner similar to that of the examples. Table 4 shows the results.

TABLE 4

| | Example | | | | Comparative example | |
|---|---|---|---|---|---|---|
| | 10 | 11 | 12 | 13 | 5 | 6 |
| Construction of bearing | | | | | | |
| Rolling element | SUJ2 | SUJ2 | SUJ2 | SUJ2 | SUJ2 | SUJ2 |
| Retainer | PEEK resin | PI resin | PEEK resin | PAI/PPS resin | Corrugated SPCC | Corrugated SPCC |
| Inner and outer rings | SUJ2 | SUJ2 | SUJ2 | SUJ2 | SUJ2 | SUJ2 |
| Enclosed grease | Grease 2 | Grease 2 | Grease 3 | Grease 2 | Grease 2 | Grease 3 |
| Base oil | PFPE oil (side chain) | PFPE oil (side chain) | PFPE oil (straight-chain) | PFPE oil (side chain) | PFPE oil (side chain) | PFPE oil (straight-chain) |
| Thickener | Fluorocarbon resin | Fluorocarbon resin | Fluorocarbon resin | Fluorocarbon resin | Fluorocarbon resin | Fluorocarbon resin |
| Endurance time at high temperature (hour) | 2300 | 2200 | 1900 | 2300 | 1700 | 1200 |

As shown in table 4, the rolling bearings of the examples 10 through 13 in which the retainer made of resin were used were superior to the rolling bearings of the comparative examples in the high-temperature durability test.

Examples 14 Through 16 and Comparative Examples 7 Through 11

By using bearings each having a construction shown in table 5 and grease shown in table 5, specimen rolling bearings were prepared. The obtained specimen rolling bearings were evaluated in the high-temperature durability test. As the specimen rolling bearing, the bearing 6204 in which seven balls (5/16 inches) were used as rolling elements was used.

The grease shown in table 5 was enclosed in the bearing 6204ZZ cleaned with petroleum benzine at 38% of the entire spatial volume thereof to prepare a specimen rolling bearing of each example. Each obtained rolling bearing was evaluated in the high-temperature durability test. The high-temperature durability time period was set up to 4000 hours. In the comparative examples 10 and 11, the atmospheric temperature in the high-temperature durability test was set to 180° C. Table 5 shows the results.

TABLE 5

| | Example | | | Comparative example | | | | |
|---|---|---|---|---|---|---|---|---|
| | 14 | 15 | 16 | 7 | 8 | 9 | 10 | 11 |
| Construction of bearing | | | | | | | | |
| Rolling element | Silicon nitride | Silicon nitride | Silicon nitride | SUJ2 | SUJ2 | SUJ2 | Silicon nitride | SUJ2 |

TABLE 5-continued

|  | Example | | | Comparative example | | | | |
| --- | --- | --- | --- | --- | --- | --- | --- | --- |
|  | 14 | 15 | 16 | 7 | 8 | 9 | 10 | 11 |
| Inner and outer rings | SUJ2 | SUJ2 | SUJ2 | SUJ2 | SUJ2 | SUJ2 | SUJ2 | SUJ2 |
| Retainer | Corrugated SPCC | Corrugated SPCC | Corrugated SPCC | Corrugated SPCC | Corrugated SPCC | Corrugated SPCC | Corrugated SPCC | Corrugated SPCC |
| Enclosed grease | Grease 2 | Grease 3 | Grease 5 | Grease 2 | Grease 3 | Grease 5 | Grease 4 | Grease 4 |
| Base oil | PFPE oil (side chain) | PFPE oil (straight-chain) | PFPE oil (side chain) | PFPE oil (side chain) | PFPE oil (straight-chain) | PFPE oil (side chain) | Aromatic ester oil | Aromatic ester oil |
| Thickener | Fluorocarbon resin | Fluorocarbon resin | Fluorocarbon resin | Fluorocarbon resin | Fluorocarbon resin | Fluorocarbon resin | Urea compound | Urea compound |
| Evaporation rate (wt %) | 6.5 | 3.2 | 35.8 | 6.5 | 3.2 | 35.8 | — | — |
| High-temperature durability test | | | | | | | | |
| Temperature in test (° C.) | 200 | 200 | 200 | 200 | 200 | 200 | 180 | 180 |
| Endurance time at high temperature (hour) | >4000 | 3600 | 570 | 1700 | 1200 | 185 | 3800 | 3700 |

In table 5, as shown in the form of combinations of the example 14 and the comparative example 7, the example 15 and the comparative example 8, and the example 16 and the comparative example 9, the rolling bearing of each of the examples in which the rolling elements were made of ceramics was excellent in durability compared with the rolling bearings of the comparative examples in which the same grease as that used in the examples was used and the rolling elements were made of steel.

On the other hand, there was no difference between the rolling bearings of the comparative examples 10 and 11 in the endurance time owing to the difference of materials of rolling elements. The bearing of the example 14 in which the fluorine-containing grease was enclosed and the ceramic rolling elements were used showed a durability superior to that of the bearing of the comparative examples 10 and 11, although the temperature condition of the former was more severe than that of the latter.

INDUSTRIAL APPLICABILITY

The lubricating grease of the present invention is a fluorine-containing grease which contains the PFPE oil as the base oil thereof, the fluorocarbon resin powder as the thickener thereof, and the additive. The additive contains the substance capable of forming the film on the metal surface. Therefore the lubricating grease restrains the fluorine and the steel from reacting with each other and has a long life owing to the utilization of the heat resistance and lubricity inherent in PFPE. Therefore the lubricating grease can be suitably utilized for the rolling bearing which is used for electric auxiliary machines of a car and office appliances. Further the lubricating grease can be preferably utilized for the rolling bearing which is used in the boundary lubrication condition such as in vacuum where the grease is enclosed in the bearing in a comparatively small amount.

EXPLANATION OF REFERENCE NUMERALS AND SYMBOLS

1: rolling bearing
2: inner ring
3: outer ring
4: rolling element
5: retainer
6: sealing member
7: lubricating grease

The invention claimed is:

1. A rolling bearing comprising an inner ring and an outer ring disposed concentrically with each other; a plurality of rolling elements interposed between said inner ring and said outer ring; and a retainer holding said rolling elements; wherein lubricating grease is enclosed on the periphery of said rolling elements;
at least one of said inner ring, said outer ring, said rolling elements, and said retainer is composed of a ferrous metal material on which a newly generated surface is exposed owing to frictional wear of a bearing portion;
said lubricating grease contains perfluoropolyether oil as a base oil thereof and fluorocarbon resin powder as a thickener thereof; and
a resin layer is formed on surfaces of said rolling elements or/and a contact surface of said retainer which contacts said rolling elements,
said resin layer comprises a resin consisting of an aromatic polyimide-based resin.

2. The rolling bearing according to claim 1, wherein said resin layer is a layer consisting of aromatic polyimide-based resin.

3. The rolling bearing according to claim 1, wherein a thickness of said resin layer is 0.1 μm to 100 μm.

4. The rolling bearing according to claim 1, wherein an evaporation rate of said lubricating grease after said lubricating grease is left for 24 hours at 200° C. is 0.1 to 15 wt %.

5. A rolling bearing comprising an inner ring and an outer ring disposed concentrically with each other; a plurality of rolling elements interposed between said inner ring and said outer ring and a retainer holding said rolling elements;
wherein lubricating grease is enclosed on the periphery of said rolling elements;
at least one of said inner ring, said outer ring, and said rolling elements is composed of a ferrous metal material on which a newly generated surface is exposed owing to frictional wear of a wearing portion;
said lubricating grease contains perfluoropolyether oil as a base oil thereof and fluorocarbon resin powder as a thickener thereof; and a resin layer is formed on surfaces of said rolling elements or/and said retainer is a resin molding comprising at least one member selected from the group consisting of polyamide resin, polyether ketone resin, polyphenylene sulfide resin, aromatic polyimide resin, phenol resin.

6. The rolling bearing according to claim 5, wherein said resin said resin molding consists of a mixture of polyphenylene sulfide resin and aromatic polyamide-imide resin.

7. The rolling bearing according to claim 5, wherein an evaporation rate of said lubricating grease after said lubricating grease is left for 24 hours at 200° C. is 0.1 to 15 wt %.

8. The roiling bearing according to claim 5, said resin molding comprises a fibrous filler.

9. A rolling bearing comprising an inner ring and an outer ring disposed concentrically with each other; a plurality of rolling elements interposed between said inner ring and said outer ring; and a retainer holding said rolling elements;
    wherein lubricating grease is enclosed on the periphery of the rolling elements;
    at least one of said inner ring, said outer ring, and said retainer is composed of a ferrous metal material on which a newly generated surface is exposed owing to frictional wear of a bearing portion;
    said lubricating grease containing perfluoropolyether oil as a base oil thereof and fluorocarbon resin powder as a thickener thereof; and said rolling elements are ceramic molding.

10. The rolling bearing according to claim 9, wherein said ceramic molding consists of silicon nitride.

\* \* \* \* \*